United States Patent Office 3,459,738
Patented Aug. 5, 1969

3,459,738
N-SUBSTITUTED LACTAMS
Henri Morren, Forest, Belgium, assignor to UCB (Union Chimique-Chemische Bedrijven), Saint-Gilles-Brussels, Belgium
No Drawing. Filed Aug. 3, 1965, Ser. No. 477,004
Claims priority, application Great Britain, Aug. 6, 1964, 32,037/64
Int. Cl. C07d 29/22, 27/08; A61k 25/00
U.S. Cl. 260—239.3                            12 Claims

ABSTRACT OF THE DISCLOSURE

Compounds of the formula

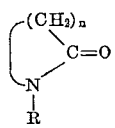

wherein $n$ is 3, 4 or 5, R is

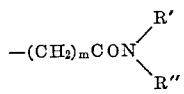

wherein $m$ is 1 or 2, and R′ and R″ are the same or different, each having H, alkyl, cycloalkyl, alkenyl, or phenyl, or R′ and R″ together with the N atom, form pyrrolidino, are active in the central nystagmus test but do not possess antihistamine and/or anticholinergic properties; they are therefore useful in the treatment of motion sickness and the like while being free from disadvantages generally bound up with antihistamines and anticholerginics (e.g. drowsiness etc.). Methods of preparing the compounds of the said formula are disclosed.

---

The present invention relates to new and useful N-substituted lactams and to the prepartion thereof. The present invention is also related to the use of these compounds in the therapeutic field, for example, in the treatment of motion sickness.

Drugs hitherto used for the treatment of motion sickness contain antihistamine and/or anticholinergic substances. These drugs are, however, limited in their use because of the side effects which they produce, such as somnolence (in the case of antihistamine products), dryness of the mouth and visual disorders (in the case of antichlolinergic substances).

W. J. Oosterveld ("Effects on Central Nystagmus," Thesis, Amsterdam, Drukkerij Van Wijk Oostzaan (1963), p. 59) has shown that there is a direct relationship betwen activity on central nystagmus and the activity of drugs useful in the treatment of motion sickness. The central nystagmus test has been described by J. Lackmann et al. (Amer. J. Physiol., 193, (1958), 328–34).

During experiments in this field, I have found that certain compounds possessing powerful antihistamine and/or anticholinergic properties are practically inactive in the central nystagmus test. It is, therefore, assumed that antihistamine and/or anticholinergic properties are neither necessary nor sufficient to obtain a good drug useful in the treatment of motion sickness and that a positive test of central nystagmus is neither related to antihistamine nor to anticholinergic activity. For this reason, I have tried to discover compounds which, while being active in the central nystagmus test, do not possess antihistamine and/or anticholinergic properties and, consequently, do not have the disadvantages mentioned above.

According to the present invention, I have found that certain N-substituted lactams fully comply with these conditions. The compounds according to the present invention have, in fact, as great an activity as that of the best antihistamine and/or anticholinergic substances in the central nystagmus test; in addition, they are completely without any harmful side effects.

The new compounds of the present invention are N-substituted lactams of the formula:

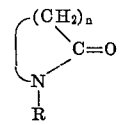

wherein $n$ is an integer of from 3 to 5 and R represents a

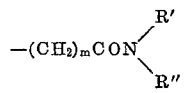

radical in which $m$ is 1 or 2, R′ and R″, which may be same or different, are hydrogen atoms or alkyl, cycloalkyl, alkenyl, alkynyl or phenyl radicals, or R′ and R″, together with the nitrogen atom, form a heterocyclic ring, such as pyrrolidine.

The new compounds of the present invention may be prepared, for example, by one of the following processes:

(1) Reaction of the appropriate N-substituted lactam with an alkali metal hydride to form the corresponding alkali metal derivative, which is reacted with an appropriate omega-chloroacylamide of the formula $$Cl(CH_2)_m CON(R')R''$$

in which $m$, R′ and R″ have the same meanings as given above, in accordance with the equation:

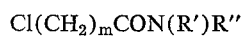
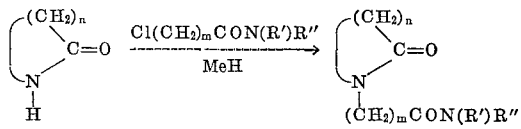

Me representing an alkali metal.

(2) Reaction of an appropriate lactam-N-alkanoic acid (when $m=1$ or 2), with a compound of the formula HN(R′)R″ in which R′ and R″ have the same meanings as given above, in accordance with the equation:

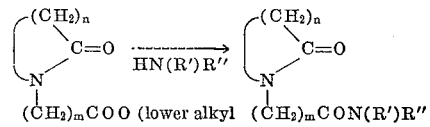

Pharmacological tests of the compounds according to the present invention have shown that:

(a) The active dose in the rabbit, administered intravenously, is from 2 to 4 mg./kg., which corresponds to the doses of antihistamine and/or anticholinergic drugs used for motion sickness, for example scopolamine and 2-(benzhydryloxy)-ethyldimethylamine hydrochloride;

(b) The lethal dose L.D. 50 in the mouse, administered intravenously, is higher than 10,000 mg./kg., which is a negligible toxicity which is about 100 times lower than that of ordinary antihistamine and/or anticholinergic drugs;

(c) Antihistamine activity in the guinea-pig is nil;

(d) Atropinic activity in the mouse is nil;

(e) No somnolence is induced in the rabbit, even in the determination of the electroencephalogram, for doses up to 3000 mg./kg., administered intravenously, i.e. 1000 times as great as the practical dose used.

Clinical tests relating to the oral administration of a dose of 200 mg. of one of the compounds of the present invention, namely N-(2-propynyl)-2-oxo-1-pyrrolidineacetamide, have shown that, of 18 persons tested, 16 showed an appreciable decrease of the duration of nystagmus. The maximum effect observed is obtained 3 hours after the administration of the product. After 5 hours, the effect is still appreciable. The activity on the duration of the nystagmus is, therefore, extremely important.

EXAMPLE 1

N-(2-propynyl)-2-oxo-1-piperidineacetamide

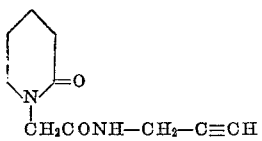

0.2 mole of sodium hydride is added to a solution of 0.2 mole of 2-piperidone in 300 ml. of anhydrous dioxan and the mixture is stirred at room temperature for 15 minutes. It is then heated for 1 hour at 80° C.

The mixture is cooled to 200° C. and a solution of 0.2 mole of N-(2-propynyl)-chloroacetamide in 300 ml. of anhydrous dioxan is added slowly. After complete addition, the mixture is heated under reflux for 2 hours.

The mixture is hot filtered through Hyflocel and the filtrate evaporated to dryness. The evaporation residue is taken up in hot ethyl acetate. The product is cooled, filtered through Hyflocel, the filtrate evaporated and the product distilled. The fraction distilling between 160 and and 200° C./0.01 mm. Hg is crystallized in a 5/1 mixture of ethyl acetate and hexane.

The resulting compound melts at 103–104° C.

Analysis of the compound for $C_{10}H_{14}N_2O_2$.—Percent N: Calculated, 14.44. Found, 14.54.

N-(2-propynyl)-chloroacetamide used as starting material was prepared in the following manner:

1 mole of chloroacetyl chloride in 0.5 liter of anhydrous toluene is added to a solution of 2 moles of 2-propynylamine in 1 liter of anhydrous toluene, the temperature being maintained below 1° C. After complete addition, the mixture is stirred for 1 hour at room temperature. The mixture is filtered and the solid matter taken up twice with 500 ml. of hot toluene. The toluene solutions are combined and then concentrated to a volume of 300 ml. N-(2-propynyl)-chloroacetamide is obtained in a yield of 80%; M.P. 67–68° C.

Analysis of the compound for $C_5H_6ClNO$.—Calculated: N, 10.65%, Cl, 27.0%. Found: N, 10.59%; Cl, 27.1%.

EXAMPLE 2

N-(2-propynyl)-hexahydro-2-oxo-azepine-1-acetamide

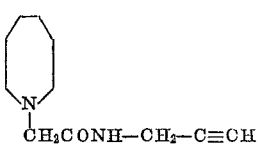

This compound is prepared, according to the method of Example 1, from hexahydro-2H-azepine-2-one and N-(2-propynyl)chloroacetamide; M.P. 109–109.5° C.

Analysis of the compound for $C_{11}H_{16}N_2O_2$. percent N: Calculated, 13.46. Found, 13.53.

EXAMPLE 3

The following compounds were prepared according to the procedure of Example 1 from 2-oxopyrrolidine and the approriate acetamide:

N-ethyl-2-oxo-1-pyrrolidineacetamide

B.P. 130–140° C./0.01 mm., Hg
M.P. 84–85.5° C.

N-propyl-2-oxo-1-pyrrolidineacetamide

B.P. 155–160° C./0.01 mm. Hg

N-allyl-2-oxo-1-pyrrolidineacetamide

B.P. 152–156° C./0.01 mm. Hg

N-(2-propynyl)-2-oxo-1-pyrrolidineacetamide

M.P. 106–107° C. (crystallized from ethyl acetate)

N,N-diethyl-2-oxo-1-pyrrolidineacetamide

M.P. 61.5–62.5° C.

EXAMPLE 4

2-oxo-1-pyrrolidineacetamide

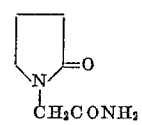

A solution of 0.3 mole of ethyl 2-oxo-1-pyrrolidine acetate in 300 ml. of methanol, saturated with ammonia at 20–30° C., is heated at 40–50° C. for 5 hours, while continuously introducing ammonia. The reaction mixture is evaporated to dryness and the residue recrystallized from isopropanol. 2-oxo-1-pyrrolidine acetamide is obtained in a yield of 86%. M.P. 151.5–152.5° C.

Analysis of the compound for $C_6H_{10}N_2O_2$.— percent N: Calculated, 19.72. Found, 19.71.

2-oxo-1-pyrrolidinepropionamide was also obtained by this process; M.P. 142–143° C.

These two compounds have also been prepared according to the procedure of Example 1.

EXAMPLE 5

2-oxo-1-pyrrolidineacetanilide

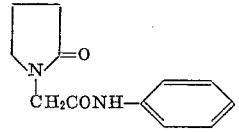

0.15 mole of ethyl 2-oxo-1-pyrrolidineacetate is added, in an inert atmosphere, to a mixture of 0.5 mole of aniline and 0.5 g. of finely divided metallic sodium. After complete addition, the mixture is slowly heated until the sodium is completely dissolved and then the temperature is raised to 120 °C. and kept at that level for 3 hours. 150 ml. of anhydrous toluene are added, the mixture is diluted with hexane until it starts to become cloudy, seed crystals are added and crystallisation occurs. The mixture is filtered and the solid material recrystallized from ethyl acetate. 2-oxo-1-pyrrolidineacetanilide is obtained; M.P. 171–72° C.

Analysis of the compound for $C_{12}H_{14}N_2O_2$.—percent N: Calculated, 12.84. Found, 12.78.

The following compounds were obtained by the same procedure:

2-oxo-1-pyrrolidineacetopyrrolidide

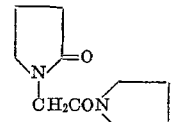

M.P.: 100.5–101.5° C. (crystallized from a 1/1 mixture of ethyl acetate and hexane).

N-cyclohexyl-2-oxo-1-pyrrolidineacetamide

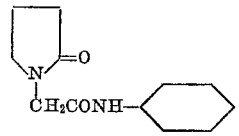

M.P.: 97–98° C. (crystallized from a 1/1 mixture of ethyl acetate and hexane).

I claim:
1. A compound of the formula:

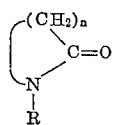

wherein n is an integer from 3 to 5, and R is

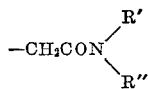

and R' and R" taken separately each represents a member selected from the group consisting of hydrogen, lower alkyl, lower alkenyl, lower alkynyl, phenyl and cycloalkyl containing 3 to 6 carbon atoms and taken together represent with the adjacent nitrogen atom a pyrrolidine group.

2. N-(2-propynyl)-2-oxo-1-piperidineacetamide.
3. N-(2-propynyl)-hexahydro-2-oxo-azepine-1-acetamide.
4. N-ethyl-2-oxo-1-pyrrolidineacetamide.
5. N-propyl-2-oxo-1-pyrrolidineacetamide.
6. N-allyl-2-oxo-1-pyrrolidineacetamide.
7. N-(2-propynyl)-2-oxo-1-pyrrolidineacetamide.
8. N,N-diethyl-2-oxo-1-pyrrolidineacetamide.
9. 2-oxo-1-pyrrolidineacetamide.
10. 2-oxo-1-pyrrolidineacetanilide.
11. 2-oxo-1-pyrrolidineacetopyrrolidide.
12. N-cyclohexyl-2-oxo-1-pyrrolidineacetamide.

References Cited
UNITED STATES PATENTS 3,250,784 5/1966 Gensheimer et al. __ 260—326.3
3,185,678 5/1965 Abood.
3,304,291 2/1967 Dachs et al.

HENRY R. JILES, Primary Examiner
R. T. BOND, Assistant Examiner

U.S. Cl. X.R.
260—326, 294; 424—244, 267, 274